(12) United States Patent
Han et al.

(10) Patent No.: US 12,218,350 B2
(45) Date of Patent: Feb. 4, 2025

(54) NEGATIVE ELECTRODE FOR LITHIUM METAL BATTERY AND LITHIUM METAL BATTERY COMPRISING SAME

(71) Applicant: Samsung SDI Co., Ltd., Yongin-si (KR)

(72) Inventors: Sangil Han, Yongin-si (KR); Ilseok Kim, Yongin-si (KR); Jinkyu Kim, Yongin-si (KR); Jeonghye Lee, Yongin-si (KR); Byeonggyu Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 18/406,069

(22) Filed: Jan. 5, 2024

(65) Prior Publication Data

US 2024/0145703 A1   May 2, 2024

Related U.S. Application Data

(63) Continuation of application No. 18/048,405, filed on Oct. 20, 2022, now Pat. No. 11,876,223, which is a
(Continued)

(30) Foreign Application Priority Data

Dec. 4, 2017   (KR) ........................ 10-2017-0165353

(51) Int. Cl.
*H01M 4/525* (2010.01)
*H01M 4/36* (2006.01)
(Continued)

(52) U.S. Cl.
CPC .......... *H01M 4/525* (2013.01); *H01M 4/366* (2013.01); *H01M 4/505* (2013.01); *H01M 4/583* (2013.01);
(Continued)

(58) Field of Classification Search
None
See application file for complete search history.

(56) References Cited

U.S. PATENT DOCUMENTS

| 9,391,329 B2 | 7/2016 | Yoon et al. |
| 10,199,693 B2 | 2/2019 | Jang et al. |

(Continued)

FOREIGN PATENT DOCUMENTS

| CA | 2820468 A1 | 12/2014 |
| CN | 102306757 A | 1/2012 |

(Continued)

OTHER PUBLICATIONS

Chinese Office Action dated May 31, 2023, including Search Report dated May 12, 2023, for corresponding Application No. 201880078424. 6, including English translation, 20 pages.
(Continued)

*Primary Examiner* — Wyatt P McConnell
(74) *Attorney, Agent, or Firm* — Lewis Roca Rothgerber Christie LLP

(57) ABSTRACT

The present invention provides a negative electrode for a lithium metal battery and a lithium metal battery comprising the same, the negative electrode comprising: a first negative electrode including a lithium metal negative electrode; and a second negative electrode which is disposed on the first negative electrode and includes a coating layer including a carbon-based material. By using the negative electrode for a lithium metal battery, a lithium metal battery can have an improved charge and discharge efficiency and life time.

15 Claims, 6 Drawing Sheets

Related U.S. Application Data continuation of application No. 16/768,212, filed as application No. PCT/KR2018/012345 on Oct. 18, 2018, now Pat. No. 11,575,130.

(51) Int. Cl.
  *H01M 4/505* (2010.01)
  *H01M 4/583* (2010.01)
  *H01M 4/62* (2006.01)
  *H01M 10/0525* (2010.01)
  *H01M 4/02* (2006.01)

(52) U.S. Cl.
  CPC ....... *H01M 4/623* (2013.01); *H01M 10/0525* (2013.01); *H01M 2004/027* (2013.01); *H01M 2004/028* (2013.01)

(56) References Cited

U.S. PATENT DOCUMENTS

| | | | |
|---|---|---|---|
| 10,418,629 | B2 | 9/2019 | Misaki et al. |
| 10,741,846 | B2 | 8/2020 | Lee et al. |
| 2012/0064409 | A1 | 3/2012 | Zhamu et al. |
| 2013/0309571 | A1* | 11/2013 | Yoon .................... H01M 4/583 429/213 |
| 2015/0044565 | A1 | 2/2015 | Wang et al. |
| 2015/0093648 | A1 | 4/2015 | Son et al. |
| 2015/0155559 | A1 | 6/2015 | Zimmerman et al. |
| 2015/0243995 | A1 | 8/2015 | Chu et al. |
| 2016/0149212 | A1 | 5/2016 | Zaghib et al. |
| 2019/0112453 | A1 | 4/2019 | Kim et al. |
| 2020/0063036 | A1 | 2/2020 | Zaghib et al. |
| 2020/0075942 | A1 | 3/2020 | Choi et al. |

FOREIGN PATENT DOCUMENTS

| | | |
|---|---|---|
| CN | 104541389 A | 4/2015 |
| CN | 104617259 A | 5/2015 |
| CN | 204441366 U | 7/2015 |
| CN | 104966814 A | 10/2015 |
| CN | 105006559 A | 10/2015 |
| CN | 105431967 A | 3/2016 |
| CN | 105845891 A | 8/2016 |
| CN | 106328892 A | 1/2017 |
| CN | 106558692 A | 4/2017 |
| CN | 107359309 A | 11/2017 |
| JP | 2009-140648 A | 6/2009 |
| JP | 2015-520926 A | 7/2015 |
| JP | 2015-195171 A | 11/2015 |
| KR | 10-2013-0033733 A | 4/2013 |
| KR | 10-2013-0128273 A | 11/2013 |
| KR | 10-2015-0039555 A | 4/2015 |
| KR | 10-2016-0023653 A | 3/2016 |
| KR | 10-2016-0037782 A | 4/2016 |
| KR | 10-2017-0066848 A | 6/2017 |
| KR | 10-2018-0105345 A | 9/2018 |
| WO | WO 2017/196105 A1 | 11/2017 |

OTHER PUBLICATIONS

Chinese Office Action, with English translation, dated Sep. 5, 2022, issued in corresponding Chinese Patent Application No. 201880078424.6 (20 pages).

Doron Aurbach et al., The Correlation Between Surface Chemistry, Surface Morphology, and Cycling Efficiency of Lithium Electrodes in a Few Polar Aprotic Systems, J. Electrochem. Soc., Nov. 1989, pp. 3198-3205, vol. 136, No. 11, The Electrochemical Society, Inc.

Doron Aurbach et al., The Electrochemical Behavior Of 1,3-Dioxolane-LiClO$_4$ Solutions—I. Uncontaminated Solutions, Electrochimica Acta, 1990, pp. 625-638, vol. 35, No. 3, Pergamon Press plc., Great Britain.

EPO Extended European Search Report dated Jul. 28, 2021, issued in corresponding European Patent Application No. 18885308.9 (9 pages).

Fei Ding et al., Dendrite-Free Lithium Deposition via Self-Healing Electrostatic Shield Mechanism, Journal of the American Chemical Society, 2013, pp. 4450-4456, vol. 135, ACS Publications.

Fei Ding et al., Effects of Carbonate Solvents and Lithium Salts on Morphology and Coulombic Efficiency of Lithium Electrode, Journal of the Electrochemical Society, 2013, pp. A1894-A1901, vol. 160, No. 10, The Electrochemical Society, Inc.

Gan, Lei et al.; "A facile synthesis of graphite/silicon/graphene spherical composite anode for lithium-ion batteries"; Electrochimica Acta; vol. 104; 2013; pp. 117-123.

International Search Report, Mailing Date Mar. 21, 2019, Corresponding to PCT/KR2018/012345, 2 pages.

Japanese Office Action dated Jun. 28, 2021, issued in corresponding Japanese Patent Application No. 2020-549522 (3 pages).

Korean Notice of Allowance dated Nov. 4, 2022, for corresponding Korean Patent Application No. 10-2017-0165353, 3 pages.

Patrick C. Howlett et al., High Lithium Metal Cycling Efficiency in a Room-Temperature Ionic Liquid, Electrochemical and Solid-State Letters, 2004, pp. A97-A101, vol. 7, No. 5, The Electrochemical Society, Inc.

Ren, Yurong et al.; "A Facile Synthesis of SiO$_2$@C@graphene Composites as Anode Material For Lithium Ion Batteries"; Int. J. Electrochem. Sci.; 9 (2014); pp. 7784-7794.

Son, In Hyuk, et al., "Graphene balls for lithium rechargeable batteries with fast charging and high volumetric energy densities," Nature Communications, vol. 8, 2017, 11 pages.

U.S. Notice of Allowance dated Sep. 30, 2022, for cross reference U.S. Appl. No. 16/768,212, (3 pages).

U.S. Office action dated Jun. 9, 2022, for cross reference U.S. Appl. No. 16/768,212, (5 pages).

Zhang, Wen Ling et al.; "Silica-Graphene Oxide Hybrid Composite Particles and Their Electroresponsive Characteristics"; Langmuir; 2012; 28 (17); pp. 7055-7062.

Zheng, Guangyuan, et al., "Interconnected hollow carbon nanospheres for stable lithium metal anodes," Nature Nanotechnology, vol. 9, 2014, 6 pages.

* cited by examiner

NEGATIVE ELECTRODE FOR LITHIUM METAL BATTERY AND LITHIUM METAL BATTERY COMPRISING SAME

CROSS-REFERENCE TO RELATED APPLICATIONS

This application is a continuation of U.S. patent application Ser. No. 18/048,405, filed on Oct. 20, 2022, which is a continuation application of U.S. patent application Ser. No. 16/768,212, filed on May 29, 2020, now issued as U.S. Pat. No. 11,575,130, which is a National Phase Patent Application of International Patent Application No. PCT/KR2018/012345, filed on Oct. 18, 2018, which claims priority to Korean Patent Application No. 10-2017-0165353, filed on Dec. 4, 2017, the entire contents of all of which are incorporated herein by reference.

BACKGROUND ART

Among currently commercially available secondary batteries, lithium secondary batteries are high-performance secondary batteries having highest energy density and may be used in various fields such as electric vehicles.

As a negative electrode of a lithium secondary battery, a lithium metal may be used. In a case of using the lithium metal as a negative electrode, unlike in a case of using graphite, a lithium film may be continuously formed, resulting in depletion of lithium. In addition, due to high reactivity of lithium, the lithium metal used as a negative electrode may be highly reactive with respect to a liquid electrolyte during charging or discharging and dendrite formation may occur on the surface of the lithium metal electrode, thereby degrading the life time and stability of a lithium secondary battery employing such a lithium metal. Accordingly, there is a need for improved lithium secondary battery in view of life time and stability.

DESCRIPTION OF EMBODIMENTS

Technical Problem

An aspect is to provide a negative electrode for a lithium metal battery.

Another aspect is to provide a lithium metal battery comprising the above-described negative electrode to achieve improved cell performance.

Solution to Problem

According to an aspect, provided is a lithium metal battery comprising: a first negative electrode including a lithium metal negative electrode; and
a second negative electrode disposed on the first negative electrode and including a coating layer containing a carbon-based material.

According to another aspect, provided is a lithium metal battery including the negative electrode, a positive electrode, and an electrolyte therebetween.

Advantageous Effects of Disclosure

By using a negative electrode for a lithium metal battery according to an embodiment, a strong SEI film can be formed on a surface of a lithium metal negative electrode, and thus a lithium film is formed on the surface of the lithium metal negative electrode, thereby avoiding a problem of lithium depletion. As a result, a charge and discharge efficiency of the lithium metal battery can be improved.

In addition, by using a negative electrode for a lithium metal battery according to an embodiment, lithium dendrite growth on a surface of the lithium metal negative electrode can be effectively suppressed, and thus a lithium electrodeposition density can be increased. As a result, a lithium metal battery having an improved life time can be provided.

MODE OF DISCLOSURE

Hereinafter, an exemplary negative electrode for a lithium metal battery, a lithium metal battery comprising the same, and a method of preparing the same will be described in further detail with reference to the accompanying drawings.

Provided is a negative electrode for a lithium metal battery including a first negative electrode including a lithium metal negative electrode, and
 a second negative electrode disposed on the first negative electrode and including a coating layer including a carbon-based material.

The most critical challenges encountered in existing lithium metal batteries including a lithium metal negative electrode are a reduced lithium density during charging and discharging cycles, and a lithium metal being porous, which are caused by a high reactivity of lithium with an electrolyte. In addition, a strong SEI film may not be formed on a surface of the lithium metal negative electrode, but a lithium film may be continuously formed thereon, resulting in depletion of lithium. Additionally, during driving of the lithium metal battery including a lithium metal negative electrode, lithium dendrite may grow on the surface of the lithium metal negative electrode, and the lithium dendrite may contact a positive electrode, resulting in a problem that the battery operation is stopped.

In order to address the above-described problems, provided is a surface-modified negative electrode for a lithium metal battery by stacking a carbon-based material on a surface of the lithium metal negative electrode in various manners. By using such a negative electrode, the depletion of lithium may be suppressed by a coating layer containing a carbon-based material formed on the surface of the lithium metal negative electrode, and a strong SEI film formed by the carbon-based material. Accordingly, the charge and discharge efficiency during electrodeposition/desorption of lithium may be improved.

In addition, by using the negative electrode, the lithium dendrite growth during driving of the battery may be suppressed, and the lithium dendrite may be controlled to be uniformly grow by preventing local growth of the dendrite, thereby improving battery performance. In addition, the negative electrode exhibits high lithium ion mobility on a surface of a lithium metal negative electrode, low resistance and an improved mechanical strength.

In an embodiment, the carbon-based material may be a spherical graphene ball including graphene and a silicon-based material.

Figure 1:
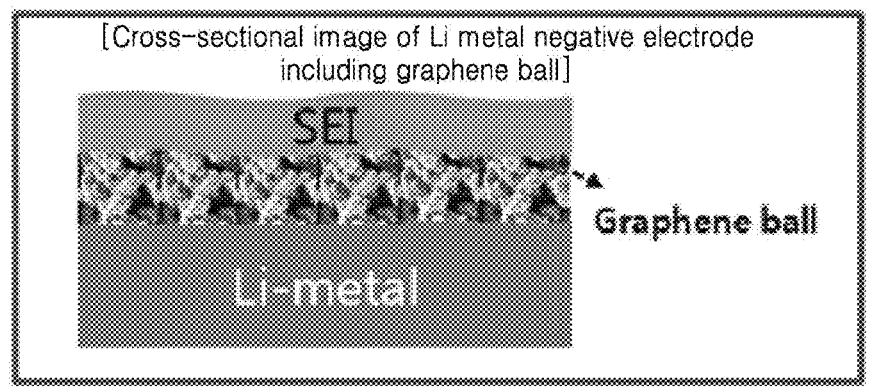
FIG. 1 schematically shows a structure of a negative electrode according to an embodiment.

FIG. 1 schematically shows a structure of a negative electrode according to an embodiment.

Referring to FIG. 1, the negative electrode for a lithium metal battery according to an embodiment includes a coating layer 120 disposed on a lithium metal negative electrode 110, the coating layer 120 including spherical graphene balls 121 including graphene and a silicon-based material, and an SEI film 130 disposed on the coating layer 120.

The silicon-based material may be $SiO_x$ (1<x<3). The silicon-based material may be, for example, $SiO_2$. The silicon-based material has a lower electrical conductivity than graphene. However, lithium may be trapped in various types of lithium silicide ($Li_xSi_y$), and may exert an effect of preventing lithium depletion when it is used as a protective film.

The graphene balls may include the silicon-based material in an amount of 50% to 80% by weight based on a total weight of the graphene balls. For example, the graphene balls may include the silicon-based material in an amount of 60% to 80% by weight based on a total weight of the graphene balls. For example, the graphene balls may include the silicon-based material in an amount of 65% to 75% by weight based on a total weight of the graphene balls.

When the amount of the silicon-based material included deviates from the range stated above, that is, when excess of the silicon-based material is included, the graphene balls may have an increased specific surface and an extremely low electrical conductivity, thus deteriorating characteristics of the battery employing the same. Conversely, when the silicon-based material is insufficiently included, the lithium discharged to the outside may not be trapped.

The graphene balls may have a specific surface area of 80 $m^2/g$ to 120 $m^2/g$. For example, the specific surface area of the graphene balls may be 90 $m^2/g$ to 110 $m^2/g$.

The graphene balls may have an electrical conductivity of 10 S/cm to 50 S/cm at room temperature (about 25° C.). For example, the graphene balls may have an electrical conductivity of 20 to 50 S/cm at room temperature (about 25° C.).

As described above, due to the inclusion of the graphene balls, the negative electrode may have improved electrical conductivity, and thus a reduction in the capacity at a high rate of 1 C or greater may be greatly suppressed, compared to the capacity at a low rate (e.g., 0.1 C).

In another embodiment, the coating layer may be a carbon layer including hard carbon or soft carbon.

Figure 2:
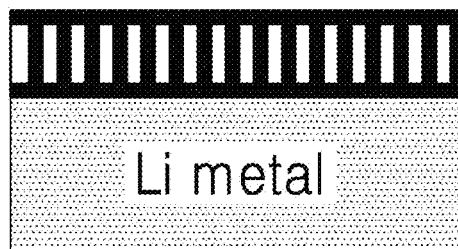
FIG. 2 schematically shows a structure of a negative electrode according to another embodiment.

FIG. 2 schematically shows a structure of a negative electrode according to another embodiment.

Referring to FIG. 2, the negative electrode for a lithium metal battery according to another embodiment includes a carbon layer 220 disposed on a lithium metal negative electrode 210.

In a specific embodiment, the coating layer may have a thickness of 2 μm to 100 μm. For example, the coating layer may have a thickness of 5 μm to 80 μm, but embodiments are not limited thereto. For example, the coating layer may have a thickness of 30 μm to 70 μm, but embodiments are not limited thereto. For example, the coating layer may have a thickness of 50 μm to 70 μm, but embodiments are not limited thereto.

When the thickness of the coating layer deviates from the range stated above, that is, when the thickness of the coating layer is extremely small, a desired effect of the inventive concept is difficult to achieve, and when the thickness of the coating layer is excessively large, the negative electrode may become unnecessarily thick, resulting in an increased ohmic resistance due to the increased thickness.

In a specific embodiment, the coating layer may further include at least one of a polymer binder and a lithium salt. For example, the coating layer may further include a polymer binder and a lithium salt. By further including the polymer binder or the lithium salt, the coating layer may obtain high electrodeposition capability and conductivity and may have an improved capacity retention rate according to repeated charge and discharge cycles.

The polymer binder may include, but not limited to, at least one selected from the group consisting of a vinylidene fluoride/hexafluoropropylene copolymer, polyvinylidene fluoride (PVDF), polyacrylonitrile, polymethylmethacrylate, polytetrafluoroethylene, and a styrene butadiene rubber-based copolymer. For example, the polymer binder may be polyvinylidene fluoride (PVDF), but embodiments are not limited thereto.

The lithium salt may include at least one selected from the group consisting of LiDFOB, LiFSI, LiSCN, $LiN(CN)_2$, $LiClO_4$, $LiBF_4$, $LiAsF_6$, $LiPF_6$, $LiCF_3SO_3$, $LiC(CF_3SO_2)_3$, $LiN(SO_2C_2F_5)_2$, $LiN(SO_2CF_3)_2$, $LiN(SO_2F)_2$, $LiSbF_6$, $LiPF_3(CF_2CF_3)_3$, $LiPF_3(CF_3)_3$, and $LiB(C_2O_4)_2$.

According to an embodiment, the coating layer may form an ion conduction pathway in the coating layer by further including a liquid electrolyte.

The liquid electrolyte may further include at least one selected from an organic solvent, an ionic liquid, and a lithium salt. The organic solvent may include a carbonate-based compound, a glyme-based compound, a dioxolane-based compound, and an ether-based compound such as dimethyl ether or 1,1,2,2-tetrafluoroethyl 2,2,3,3-tetrafluoropropyl ether. Examples of the organic solvent may include at least one selected from the group consisting of ethylene carbonate, propylene carbonate, dimethyl carbonate, diethyl carbonate, ethylmethyl carbonate, fluoroethylene carbonate, gammabutyrolactone, dimethoxyethane, diethoxyethane, dimethyleneglycol dimethylether, trimethyleneglycol dimethylether, tetraethyleneglycol dimethylether, polyethyleneglycol dimethylether, succinonitrile, sulfolein, dimethylsulfone, ethylmethylsulfone, diethylsulfone, adiponitrile, and 1,1,2,2-tetrafluoroethyl 2,2,3,3-tetrafluoropropyl ether.

The ionic liquid refers to a salt in a liquid state at room temperature or a fused salt at room temperature that includes only ions having a melting point equal to or below room temperature. For example, the ionic liquid may be at least one selected from the group consisting of N-methyl-N-propylpyrrolidinium bis(trifluoromethanesulfonyl)imide, N-butyl-N-methylpyrrolidium bis(3-trifluoromethylsulfonyl)imide, 1-butyl-3-methylimidazolium bis(trifluoromethylsulfonyl)amide, and 1-ethyl-3-methylimidazolium bis(trifluoromethylsulfonyl)amide.

When the protective film according to an embodiment is used with a liquid electrolyte including an organic solvent such as a carbonate-based compound, the protective film is very stable with respect to the organic solvent such as a carbonate-based compound or an electrolyte including the same, thus demonstrating excellent chemical resistance.

The lithium metal battery according to an embodiment may further include a separator. As the separator, polyethylene, polypropylene, or polyvinylidene fluoride, or a multilayer including at least two layers of these materials, may be used, and a mixed multilayer, such as a polyethylene/polypropylene two-layer separator, a polyethylene/polypropylene/polyethylene three-layer separator, or a polypropylene/polyethylene/polypropylene three-layer separator, may be used. An electrolyte including a lithium salt and an organic solvent may be further added to the separator.

The positive electrode may be a porous positive electrode. The porous positive electrode may be a positive electrode including pores or a positive electrode which allows permeation of the liquid electrolyte into the positive electrode due to such as a capillary phenomenon.

For example, the porous positive electrode may be a positive electrode obtained by coating a positive electrode active material composition including a positive electrode active material, a conducting agent, a binder and a solvent, and drying the resulting structure. The thus obtained positive electrode may include pores present among particles of the positive electrode active material. The porous positive electrode may be impregnated with liquid electrolyte.

According to another embodiment, the positive electrode may include a liquid electrolyte, a gel electrolyte, or a solid electrolyte. The liquid electrolyte, the gel electrolyte, and the solid electrolyte may be any suitable electrolyte for lithium batteries that does not react with the positive active material and thus prevents deterioration of the positive electrode active material during charging and discharging.

According to another aspect, provided is a method of preparing a negative electrode for a lithium metal battery.

In an embodiment, provided is a method of preparing a negative electrode for a lithium metal battery, the method including the steps of:
mixing a silicon-based material and graphene to prepare graphene balls;
dispersing the graphene balls on a polymer film using static electricity; and
placing the polymer film on a lithium metal surface and pressing to transfer the graphene balls onto the lithium metal surface.

The polymer film may be a PET film or a polyolefin film, but embodiments are not limited thereto.

In another embodiment, provided is a method of preparing a negative electrode for a lithium metal battery, the method including the steps of:
mixing a silicon-based material and graphene to prepare graphene balls;
adding the graphene balls to a solvent to prepare a graphene ball slurry; and
coating the graphene ball slurry on the lithium metal surface and drying the resultant structure.

The graphene ball slurry may include a solvent and graphene balls. A description about the graphene balls will be based on the disclosure of the present specification, and the organic solvent is not particularly limited and any organic solvent available in the art may be used. Examples of the organic solvent may include tetrahydrofuran, N-methyl pyrrolidone, acetonitrile, benzonitrile, 2-methyltetrahydrofuran, γ-butyrolactone, dioxolane, 4-methyldioxolane, N,N-dimethylformamide, N,N-dimethylacetamide, N,N-dimethylsulfoxide, dioxane, 1,2-dimethoxyethane, sulfolane, dichloroethane, chlorobenzene, nitrobenzene, diethylene glycol, dimethyl ether, or a mixture thereof. An amount of the organic solvent may be about 100 parts to about 3000 parts by weight based on 100 parts by weight of the graphene balls.

The graphene ball slurry may further include at least one selected from a polymer binder and a lithium salt. For example, the graphene ball slurry may further include a polymer binder and a lithium salt.

Types of the polymer binder and the lithium salt are not particularly limited, and the same types of the polymer binder and the lithium salt as those disclosed in this specification may be used.

The polymer binder may be included in the graphene ball slurry in an amount of about 1% to about 5% by weight based on a total weight of the graphene ball slurry, but embodiments are not limited thereto. For example, the polymer binder may be included in the graphene ball slurry in an amount of about 2% to about 4% by weight based on the total weight of the graphene ball slurry, but embodiments are not limited thereto. For example, the polymer binder may be included in the graphene ball slurry in an amount of about 2% to about 3% by weight based on the total weight of the graphene ball slurry, but embodiments are not limited thereto.

The lithium salt may be included in the graphene ball slurry in an amount of about 10% to about 30% by weight based on a total weight of the polymer binder, but embodiments are not limited thereto. For example, the lithium salt may be included in the graphene ball slurry in an amount of about 15% to about 25% by weight based on the total weight of the polymer binder, but embodiments are not limited thereto.

The method of preparing the graphene ball slurry is not particularly limited so long as any method is commonly available in the art at the time of forming the slurry. For example, the graphene ball slurry may be prepared by sonication.

When the coating layer is formed using the graphene ball slurry, the negative electrode for a lithium battery may be prepared by coating the graphene ball slurry on at least a portion of a lithium metal and drying the resultant coated product.

Any coating method commonly available in the art at the time of forming the protective film may be used as the coating method. For example, methods such as spin coating, roll coating, curtain coating, extrusion, casting, screen printing, inkjet printing, or a doctor blade process may be used.

In still another embodiment, the negative electrode for a lithium metal battery may be prepared by directly rolling a carbon layer on a lithium metal and coating the resulting rolled product.

According to still another aspect, provided is a lithium metal battery including:
a positive electrode;
a negative electrode employing the negative electrode for a lithium metal battery according to an embodiment; and
an electrolyte interposed between the positive electrode and the negative electrode.

The positive electrode may include a copper metal or a positive electrode active material represented by Chemical Formula 1:

$$LiCo_{1-x}M_xO_2 \qquad \text{<Chemical Formula 1>}$$

wherein in the above formula,
M is at least one selected from the group consisting of Ni, Mn, Al, Cu, Fe, Mg, Cr, Zn, B, and Ga, and
$0.5 < x < 1$.

In an embodiment, the positive electrode may include a positive electrode active material represented by Chemical Formula 1.

The electrolyte may be a mixed electrolyte further including at least one selected from a liquid electrolyte, a solid electrolyte, and a gel electrolyte. The lithium metal battery may further include a separator.

At least one selected from a liquid electrolyte, a polymer ionic liquid, a gel electrolyte, and a solid electrolyte may be interposed between the positive electrode and the electrolyte. By further including at least one selected from the liquid electrolyte, the polymer ionic liquid, the gel electrolyte, and the solid electrolyte, as described above, the conductivity and mechanical property of the electrolyte may be further improved.

The protective film may further include a liquid electrolyte, and thus may form an ion conduction pathway. The liquid electrolyte may further include at least one selected from an organic solvent, an ionic liquid, and a lithium salt. For example, the liquid electrolyte may include a lithium salt and an organic solvent.

The organic solvent may include a carbonate-based compound, a glyme-based compound, a dioxolane-based compound, an ether-based compound, and the like. The carbonate-based compound may include ethylene carbonate, propylene carbonate, dimethyl carbonate, fluoroethylene carbonate, diethyl carbonate, or ethylmethyl carbonate.

Examples of the glyme-based compound may include at least one selected from poly(ethylene glycol) dimethyl ether (poly(ethylene glycol) dimethyl ether; PEGDME, polyglyme), tetra(ethylene glycol) dimethyl ether(tetra(ethylene glycol) dimethyl ether; TEGDME, tetraglyme), tri(ethylene glycol) dimethyl ether(tri(ethylene glycol) dimethyl ether, triglyme), poly(ethylene glycol) dilaurate(poly(ethylene glycol) dilaurate (PEGDL), poly(ethylene glycol) monoacrylate(poly(ethylene glycol) monoacrylate (PEGMA), and poly(ethylene glycol) diacrylate(poly(ethylene glycol) diacrylate (PEGDA).

Examples of the dioxolane-based compound may include at least one selected from the group consisting of 3-dioxolane, 4,5-diethyl-dioxolane, 4,5-dimethyl-dioxolane, 4-methyl-1,3-dioxolane, and 4-ethyl-1,3-dioxolane.

Examples of the ether-based compound may include dimethylether (DME), and 1,1,2,2-tetrafluoroethyl 2,2,3,3-tetrafluoropropyl ether.

For example, the organic solvent may be a carbonate-based compound or an ether-based compound, but embodiments are not limited thereto.

The gel electrolyte may be any suitable electrolyte in gel form known in the art. For example, the gel electrolyte may include a polymer and a polymeric ionic liquid. For example, the polymer may be a solid graft (block) copolymer.

The solid electrolyte may be an organic solid electrolyte or an inorganic solid electrolyte.

Examples of the organic solid electrolyte may include a polyethylene derivative, a polyethylene oxide derivative, a polypropylene oxide derivative, a phosphate ester polymer, a poly agitation lysine, polyester sulfide, polyvinyl alcohol, polyvinylidene fluoride, and a polymer including an ionic dissociation group.

Examples of the inorganic solid electrolyte may include $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, $Cu_3N$, LiPON, $Li_2S \cdot GeS_2 \cdot Ga_2S_3$, $Li_2O \cdot 11Al_2O_3$, $(Na,Li)_{1+x}Ti_{2-x}Al_x(PO_4)_3$ (where $0.1 \leq x \leq 0.9$), $Li_{1+x}Hf_{2-x}Al_x(PO_4)_3$ (where $0.1 \leq x \leq 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, Na-silicates, $Li_{0.3}La_{0.5}TiO_3$, $Na_5MSi_4O_{12}$ (where M is a rare earth element such as Nd, Gd or Dy) $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ (where $X \leq 0.8$, $0 \leq Y \leq 1.0$, and M is Nd, Sm, Eu, Gd, Tb, Dy, Ho, Er, Tm, or Yb), $Li_{1+x+y}Q_xTi_{2-x}Si_yP_{3-y}O_{12}$ (where $0 < x \leq 0.4$, $0 < y \leq 0.6$, and Q is Al or Ga), $Li_6BaLa_2Ta_2O_{12}$, $Li_7La_3Zr_2O_{12}$, $Li_5La_3Nb_2O_{12}$, $Li_5La_3M_2O_{12}$ (where M is Nb or Ta), and $Li_{7+x}A_xLa_{3-x}Zr_2O_{12}$ (where $0 < x < 3$, and A is Zn).

The lithium metal negative electrode may be a lithium metal thin film electrode or a lithium metal alloy electrode, and may further include a liquid electrolyte disposed between the electrolyte and the positive electrode, the liquid electrolyte including at least one selected from an organic solvent, an ionic liquid, and a lithium salt.

The lithium metal battery is widely used in fields such as cell phones, notebook computers, batteries for power generation facilities such as wind power and solar power, electric vehicles, uninterruptible power supply devices, and household batteries due to high voltage, capacity and energy density.

The lithium metal battery according to an embodiment may have an operating voltage of about 4.0 V to 5 about. 0 V, for example, about 4.5 V to about 5.0 V.

Various components of the lithium metal battery including the negative electrode according to an embodiment and the method of preparing the lithium metal battery having such components will be described below in more detail.

The positive electrode active material for preparing the positive electrode may further include, but not limited to, at least one selected from the group consisting of lithium cobalt oxide, lithium nickel cobalt manganese oxide, lithium nickel cobalt aluminum oxide, lithium iron phosphate oxide, and lithium manganese oxide, in addition to the copper metal or the compound represented by Chemical Formula 1, and all positive electrode active materials available in the art may be used.

For example, the positive electrode active material may use a compound represented by one of the following chemical formulae, including $Li_aA_{1-b}B_bD_2$ (in the above formula, $0.90 \leq a \leq 1.8$, and $0 \leq b \leq 0.5$); $Li_aE_{1-b}B_bO_{2-c}D_c$ (in the above formula, $0.90 \leq a \leq 1.8$, $0 \leq b \leq 0.5$, and $0 \leq c \leq 0.05$; $LiE_{2-b}B_bO_{4-c}D_c$ (in the above formula, $0 \leq b \leq 0.5$, and $0 \leq c \leq 0.05$); $Li_aNi_{1-b-c}Co_bB_cD_\alpha$ (in the above formula, $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (in the above formula, $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_\alpha$ (in the above formula, $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (in the above formula, $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (in the above formula, $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_\alpha$ (in the above formula, $0.90 \leq a \leq 1.8$, $0 \leq b \leq 0.5$, $0 \leq c \leq 0.05$, and $0 < \alpha < 2$); $Li_aNi_bE_cG_dO_2$ (in the above formula, $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (in the above formula, $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (in the above formula, $0.90 \leq a \leq 1.8$, and $0.001 \leq b \leq 0.1$); $Li_aCoG_bO_2$ (in the above formula, $0.90 \leq a \leq 1.8$, and $0.001 \leq b \leq 0.1$); $Li_aMnG_bO_2$ (in the above formula, $0.90 \leq a \leq 1.8$, and $0.001 \leq b \leq 0.1$); $Li_aMn_2G_bO_4$ (in the above formula, $0.90 \leq a \leq 1.8$, $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (in the above formula, $0 \leq f \leq 2$); $Li_{(3-f)}Fe_2(PO_4)_3$ (in the above formula, $0 \leq f \leq 2$); and $LiFePO_4$.

In the formulae above, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

The positive electrode is prepared in the following manner.

A positive electrode active material composition in which a positive electrode active material, a binder and a solvent are mixed is prepared.

A conducting agent may further be added to the positive electrode active material composition.

The positive electrode active material composition is directly coated on a metal current collector and dried to manufacture a positive electrode plate. Alternatively, the positive electrode active material composition may be cast on a separate support, and then a film released from the support may be laminated on the metal current collector to manufacture a positive electrode plate.

The binder is added in an amount of about 1 part to about 50 parts by weight based on 100 parts by weight of the total weight of the positive electrode active material, which is a component for assisting binding between the active material and the conducting agent and binding to the current collector. Non-limiting examples of the binder may include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers, and the like. The amount of the binder is about 2 parts to about 5 parts by weight based on 100 parts by weight of the total weight of the positive electrode active material. When the amount of the binder is within the range stated above, the binding force of the active material layer to the current collector is good.

The conducting agent is not particularly limited as long as any conducting agent has conductivity without causing a chemical change in the battery, and may use, for example, graphite such as natural graphite or artificial graphite; carbonaceous materials such as carbon black, acetylene black, ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; conductive materials such as polyphenylene derivatives, and the like.

The amount of the conducting agent is about 1 part to about 10 parts by weight, for example, about 2 parts to about 5 parts by weight, based on 100 parts by weight of the total weight of the positive electrode active material. When the amount of the conducting agent is within the range stated above, the conductivity of the finally obtained electrode is good.

As a non-limiting example of the solvent, N-methylpyrrolidone, etc. may be used.

The amount of the solvent is about 100 parts to about 2000 parts by weight based on 100 parts by weight of the positive electrode active material. When the amount of the solvent is within the range stated above, an operation for forming the active material layer is easily performed.

The negative electrode may be a lithium metal thin film or a lithium alloy thin film, as described above.

The lithium alloy may include lithium and a metal/metalloid capable of alloying with lithium. For example, the metal/metalloid capable of alloying with lithium may be Si, Sn, Al, Ge, Pb, Bi, Sb, a Si—Y alloy (Y is an alkali metal, an alkali earth metal, a Group 13 element, a Group 14 element, a transition metal, a rare earth element, or a combination element thereof, and not Si), a Sn—Y alloy (Y is an alkali metal, an alkali earth metal, a Group 13 element, a Group 14 element, a transition metal, a rare earth element, or a combination element thereof, and not Sn), and the like. The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or combinations thereof.

As the electrolyte, a separator and/or a lithium salt-containing nonaqueous electrolyte commonly used in a lithium battery may be used.

The separator uses an insulating thin film having high ion permeability and mechanical strength. A pore diameter of the separator is generally about 0.01 µm to about 10 µm, and a thickness thereof is generally about 5 parts to about 20 µm. As such a separator, for example, an olefin-based polymer such as polypropylene; a sheet or nonwoven fabric made of glass fiber or polyethylene is used. When a solid polymer electrolyte is used as the electrolyte, the solid polymer electrolyte may also serve as the separator.

Specific examples of the separator may include polyethylene, polypropylene, polyvinylidene fluoride, or a multilayer film of two or more thereof may be used, and may include a mixed multilayer film such as a polyethylene/polypropylene two-layer separator, a polyethylene/polypropylene/polyethylene three-layer separator, a polypropylene/polyethylene/polypropylene three-layer separator, or the like.

The lithium salt-containing nonaqueous electrolyte may include a nonaqueous electrolyte and a lithium salt.

As the nonaqueous electrolyte, a nonaqueous electrolyte solution, an organic solid electrolyte, or an inorganic solid electrolyte may be used.

The nonaqueous electrolyte solution may include an organic solvent. As the organic solvent, any suitable organic solvent commonly used in the art may be used. For example, the organic solvent may include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, fluoroethylene carbonate, benzonitrile, acetonitrile, tetrahydrofuran, 2-methyl tetrahydrofuran, γ-butyrolactone, dioxolane, 4-methyl dioxolane, N,N-dimethylformamide, N,N-dimethylacetamide, dimethylsulfoxide, dioxane, 1,2-dimethoxyethane, sulfolane, dichloroethane, chlorobenzene, nitrobenzene, diethylene glycol, dimethyl ether or mixtures thereof. In addition, examples of the lithium salt may include $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (with the proviso that x and y are natural numbers), LiCl, LiI, or mixtures thereof.

For the purpose of improving charge/discharge characteristics or flame retardancy, for example, pyridine, triethylphosphite, triethanolamine, cyclic ether, ethylenediamine, n-glyme, hexamethyl phosphoramide, a nitrobenzene derivative, sulfur, a quinone imine dye, N-substituted oxazolidinone, N,N-substituted imidazolidine, ethylene glycol dialkyl ether, ammonium salt, pyrrole, 2-methoxyethanol, aluminum trichloride, and the like, may also be added to the non-aqueous electrolyte. In some cases, a halogen-containing solvent such as carbon tetrachloride or ethylene trifluoride may be further included to impart nonflammability to the nonaqueous electrolyte.

The lithium battery according to an embodiment may be used for not only a battery cell used as a power source for a small-sized device but also a unit cell in a medium-/large-sized battery pack or battery module including a plurality of battery cells used as a power source for a medium-/large-sized device due to good capacity and life time characteristics.

Examples of the medium-/large-sized device may include electric vehicles including an electric vehicle (EV), a hybrid electric vehicle (HEV), or a plug-in hybrid electric vehicle (PHEV), electric two-wheeled vehicles including an E-bike and an electric scooter, an electric power tool electric power storage device, and the like, but embodiments are not limited thereto.

The present disclosure will be described in more detail through the following Examples and Comparative Examples. However, the following Examples are for illustrative purposes only and are not limited thereto.

Preparation Example 1: Preparation of Graphene Balls

Graphene and $SiO_2$ were weighed such that a content of graphene became 42.5% by weight based on the weight of $SiO_2$, and mixed to then allow a reaction to be conducted at about 105° C. for 1200 minutes, thereby preparing graphene balls.

Figure 3:
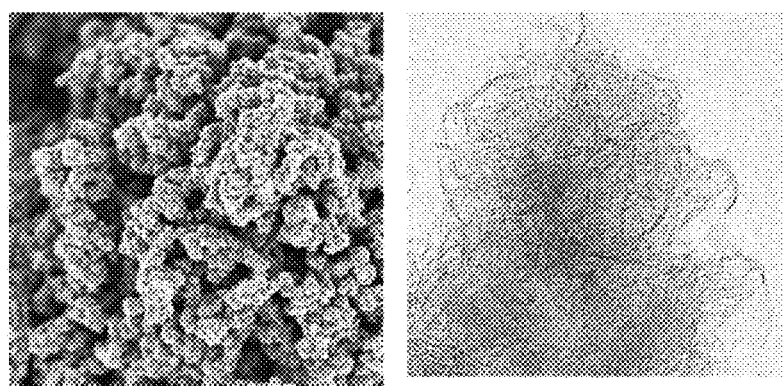
FIG. 3 is a scanning electron microscope photograph of graphene balls prepared in Preparation Example 1.

A scanning electron microscope photograph of the graphene balls prepared in Preparation Example 1 is shown in FIG. 3.

Example 1: Manufacture of Lithium Metal Battery

The graphene balls prepared in Preparation Example 1 were dispersed on a PET film using static electricity and then transferred onto a lithium metal negative electrode through a compression press process, thereby preparing a negative electrode.

A coin cell was manufactured using the prepared negative electrode as a negative electrode, a copper metal as a positive electrode, and a product obtained by mixing a mixed solvent of FEC and DEC (3:7) with 1M LiFOB as an electrolyte.

Comparative Example 1: Manufacture of Lithium Metal Battery

A coin cell was manufactured in the same manner as in Example 1, except that a lithium metal not having gone through a graphene ball transfer process was used as a negative electrode, instead of the negative electrode used in Example 1.

Evaluation Example 1: Cyclic Voltammetry Measurement

Cyclic voltammetry measurements were performed on coin cells manufactured in Example 1 and Comparative Example 1 at a scan rate of 0.1 mV/s.

Figure 4:
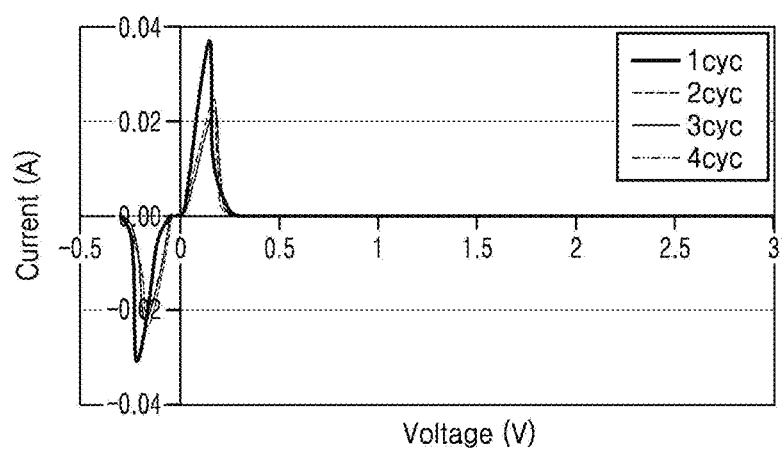
FIG. 4 is a graph showing evaluation results of a coin cell manufactured in Example 1.
Figure 5:
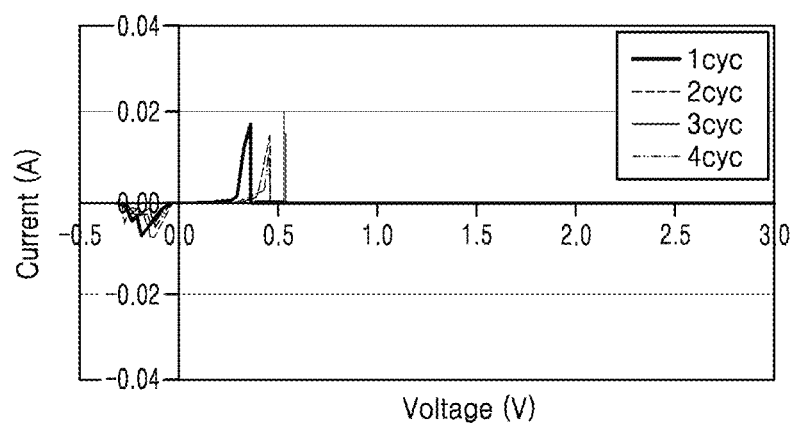
FIG. 5 is a graph showing an enlarged anodic peak of FIG. 4.
Figure 6:
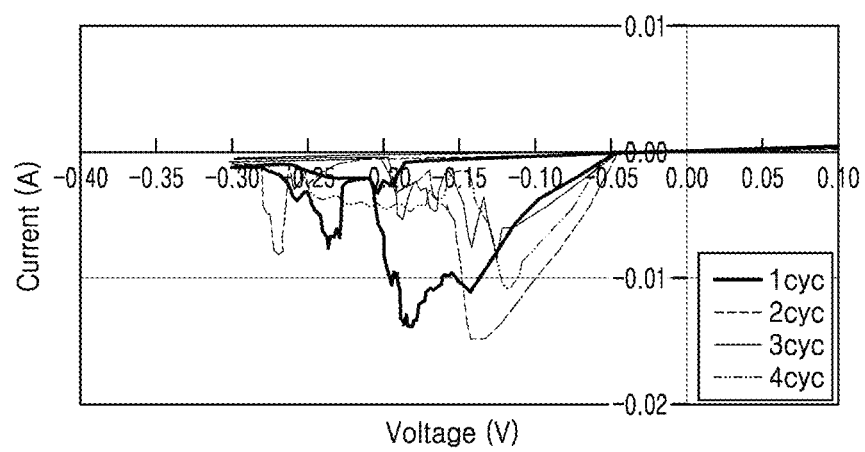
FIG. 6 is a graph showing evaluation results of a coin cell manufactured in Comparative Example 1.

The evaluation results for the coin cell manufactured in Example 1 are shown in FIG. 4, a section of 0 V or less, that is, a graph showing an enlarged anodic peak of FIG. 4, is shown in FIG. 5, and evaluation results of the coin cell manufactured in Comparative Example 1 are shown in FIG. 6.

Referring to FIGS. 4 to 6, the coin cell manufactured in Example 1 exhibited a shift in the cathodic peak, representing electrodeposition of lithium, from −0.2 V to −0.1 V. According to the progress of charge and discharge cycles, the coin cell manufactured in Example 1 showed lithium electrodeposition at a higher potential than the coin cell manufactured in Comparative Example 1. That is, the lithium electrodeposition occurred faster in the coin cell manufactured in Example 1 than in the coin cell manufactured in Comparative Example 1. This suggests that the negative electrode of Example 1 serves as an effective lithium host.

Referring to FIGS. 4 and 5, anodic peaks were also shifted to a higher potential according to the progress of cycles. This suggests that depletion of lithium can be prevented by lithium trapped into $SiO_2$ in the graphene balls of the coin cell manufactured in Example 1.

Evaluation Example 2: Measurement of Initial Charging and Discharging Efficiency Constant current charging was performed on the coin cells manufactured in Example 1 and Comparative Example 1 with a current of 0.8 mA at 25° C. until the voltage reached 4.40 V (vs. Li), and the charging was cut off at 0.5 V or a current of 8 mA while maintaining the voltage of 4.40 V in a constant voltage mode. After a rest period of 10 minutes, discharging was performed with a constant current of 0.8 mA until the voltage reached 3.0 V (vs. Li). (formation operation, 1st cycle).

Each lithium battery having gone through the formation operation (1st cycle) was charged with a constant current of 0.7 C rate at room temperature (25° C.) in a voltage range of 3.0 V to 4.4 V relative to a lithium metal until the voltage reached a cut-off voltage of 4.4 V and then constant current discharging was performed with a current of 5.6 mA.

Figure 7:
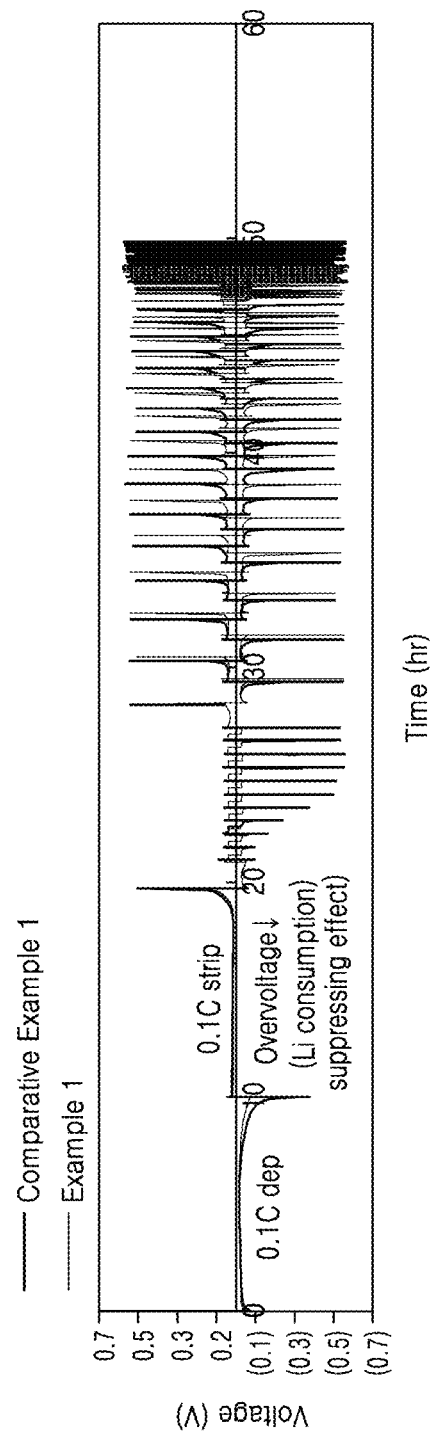
FIG. 7 shows voltage profiles of coin cells manufactured in Example 1 and Comparative Example 1.

Voltage profiles of the coin cells of Example 1 and Comparative Example 1 are shown in FIG. 7.

Referring to FIG. 7, the coin cell of Example 1 was found to suppress an overvoltage during electrodeposition and desorption of lithium, confirming that consumption of lithium was suppressed.

The measured initial charge and discharge efficiency of the coin cell of Example 1 was 97.3%, and the measured initial charge and discharge efficiency of the coin cell of Comparative Example 1 was 95.6%.

That is, the coin cell of Example 1 had an effect of suppressing lithium consumption, thereby consequently achieving a high charge and discharge efficiency.

Example 2: Manufacture of Lithium Metal Battery

A graphene ball slurry was prepared by mixing a THE solvent and the graphene balls prepared in Preparation Example 1 at a weight ratio of 90:10. The graphene ball slurry was coated on a surface of a lithium metal negative electrode to a thickness of 30 μm to prepare a negative electrode.

Separately, a positive electrode composition was obtained by mixing $LiCoO_2$, a conducting agent (Super-P; Timcal Ltd.), polyvinylidene fluoride (PVdF) and N-pyrrolidone. A mixing weight ratio of $LiCoO_2$, the conducting agent and PVDF in the positive electrode composition was 97:1.5:1.5.

The positive electrode composition was coated on an aluminum foil (thickness: about 15 μm) and dried at 25° C., and the dried product was vacuum dried at about 110° C. to prepare a positive electrode.

A polyethylene/polypropylene separator was interposed between the positive electrode obtained by the above-described process and a negative electrode (thickness: about 20 μm) to manufacture a lithium metal battery (coin cell). Here, a liquid electrolyte was additionally disposed between the positive electrode and the negative electrode. As the liquid electrolyte, an electrolyte solution having 1M LiFOB dissolved in a mixed solvent of FEC and DEC in a ratio of 3:7 by volume.

Example 3: Manufacture of Lithium Metal Battery

A lithium metal battery was manufactured in the same manner as in Example 2, except that a graphene ball slurry was coated to a thickness of 60 μm.

Example 4: Manufacture of Lithium Metal Battery

A lithium metal battery was manufactured in the same manner as in Example 2, except that a negative electrode was prepared by coating a carbon layer, instead of the graphene ball slurry, on a lithium metal negative electrode to a thickness of 30 μm by rolling.

Example 5: Manufacture of Lithium Metal Battery 0.05 g of the graphene balls prepared in Preparation Example 1, 0.02 g of LiFSI, 4 g of N-methylpyrrolidone, and 0.1 g of PVDF were mixed and then subjected to sonification for 100 minutes to prepare a graphene ball slurry. The thus prepared graphene ball slurry was coated on a lithium metal negative electrode to a thickness of about 5 μm and dried at 60° C. overnight to prepare a negative electrode.

A lithium metal battery was manufactured using the prepared negative electrode as a negative electrode, and a positive electrode and an electrolyte solution, which are the same as those of Example 2.

Comparative Example 2: Manufacture of Lithium Metal Battery

A lithium metal battery was manufactured in the same manner as in Example 2, except that a negative electrode was prepared by coating a polystyrene-polyisoprene copolymer, instead of the graphene ball slurry, on a lithium metal negative electrode to a thickness of 5 micron.

Evaluation Example 3: Evaluation of Cycle Life Characteristic

Constant current charging was performed on the lithium metal batteries (full cells) manufactured in Examples 2 to 5 and Comparative Example 2 at a constant current of 0.7 C rate at 25° C. until the voltage reached 4.40 V (vs. Li), and the charging was cut off at 0.025 C rate while maintaining the voltage of 4.40 V in a constant voltage mode. After a rest period of 10 minutes, discharging was performed with a constant current of 0.5 C rate until the voltage reached 3.0 V (vs. Li) (formation operation, 1 st cycle). This cycle of charging and discharging was additionally performed twice, and thus the formation process was completed.

Figure 8:
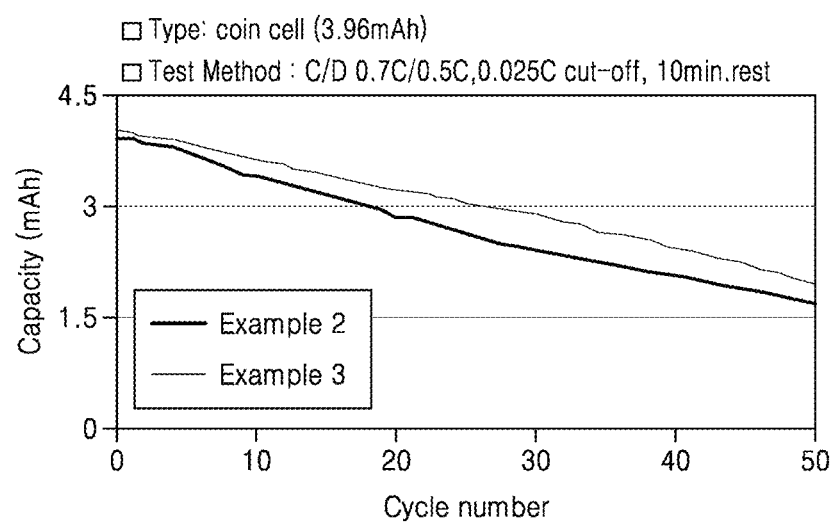
FIG. 8 is a graph showing cycle characteristics of full cells manufactured in Examples 2 and 3.
Figure 9:
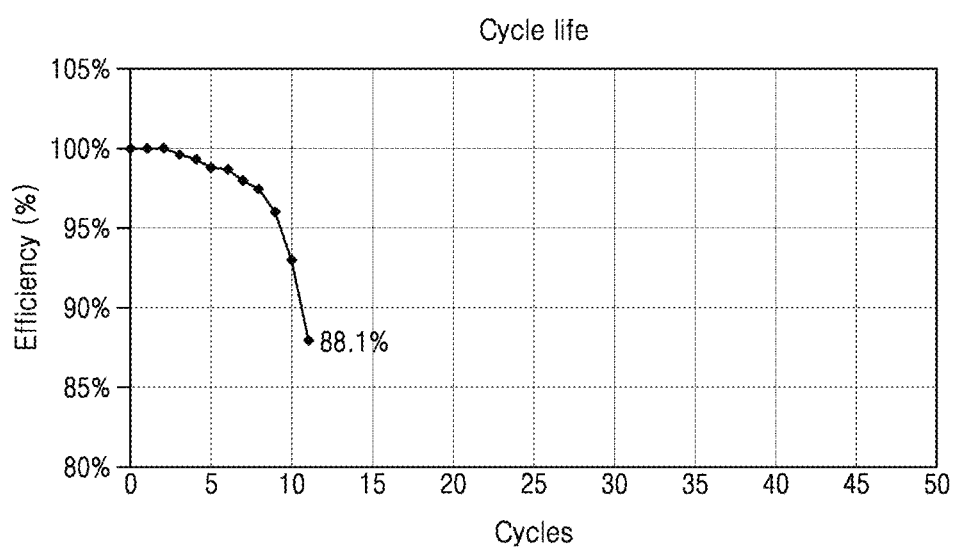
FIG. 9 is a graph showing a cycle characteristic of a full cell manufactured in Comparative Example 2.

The above-described charge and discharge process was repeatedly performed, and capacity changes with the passage of cycles are measured and the results thereof are shown in FIGS. 8 and 9. In detail, cycle characteristics of the full cells manufactured in Examples 2 and 3 are shown in FIG. 8, a cycle characteristic of the full cell manufactured in Comparative Example 2 is shown in FIG. 9, and cycle characteristics of full cells manufactured in Examples 2, 3 and 5 are shown in FIG. 10.

As can be seen from FIG. 8, it was confirmed that the full cell of Example 3, in which the graphene ball slurry coated was thicker than in Example 2, had a higher capacity retention rate than that of the full cell of Example 2 according to the passage of cycles.

In addition, as can be seen from FIG. 9, it was confirmed that the full cell of Comparative Example 2 exhibited a reduced efficiency to 88.1% after the 10th cycle, as compared with the initial efficiency.

Figure 10:
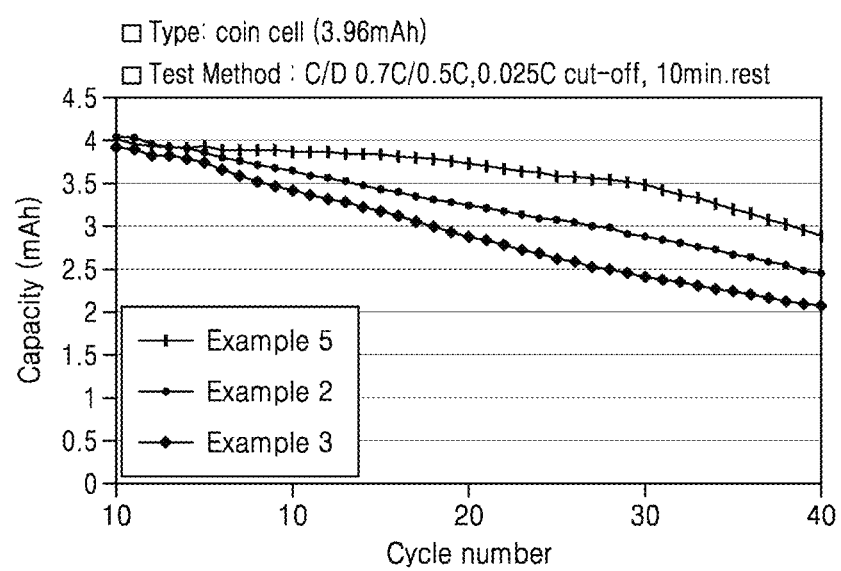
FIG. 10 is a graph showing cycle characteristics of full cells manufactured in Examples 2, 3 and 5.

Referring to FIG. 10, it is confirmed that when graphene ball slurry further includes a lithium salt and a polymer binder, the capacity retention characteristic are improved. This is attributable to a coating layer exhibiting high electrodeposition capability and conductivity by the inclusion of the lithium salt and the polymer binder.

While one or more exemplary embodiments have been described with reference to the figures and examples, the embodiments described herein have been presented by way of example only, and it will be appreciated by those skilled in the art that various changes and other equivalent embodiments may be made from the above description. Therefore, the inventive concept should be defined by the spirit and scope of the appended claims.

The invention claimed is:

1. A negative electrode for a lithium metal battery comprising:
   a first negative electrode comprising a lithium metal negative electrode; and
   a second negative electrode on the first negative electrode and comprising a coating layer comprising a carbon-based material, the carbon-based material comprising a plurality of spherical graphene balls.

2. The negative electrode of claim 1, wherein the plurality of spherical graphene balls comprising graphene and a silicon-based material.

3. The negative electrode of claim 2, wherein the silicon-based material is $SiO_x$, where $1<x<3$.

4. The negative electrode of claim 2, wherein the plurality of spherical graphene balls comprise the silicon-based material in an amount of 50% to 80% by weight based on a total weight of the graphene balls.

5. The negative electrode of claim 2, wherein the plurality of spherical graphene balls have a specific surface area of 80 $m^2/g$ to 120 $m^2/g$.

6. The negative electrode of claim 2, wherein the plurality of spherical graphene balls have an electrical conductivity of 10 S/cm to 50 S/cm at room temperature (25° C.).

7. The negative electrode of claim 1, wherein the coating layer further comprises at least one selected from a polymer binder and a lithium salt.

8. The negative electrode of claim 7, wherein the polymer binder includes at least one selected from the group consisting of a vinylidene fluoride/hexafluoropropylene copolymer, polyvinylidene fluoride (PVDF), polyacrylonitrile, polymethylmethacrylate, polytetrafluoroethylene, and a styrene butadiene rubber-based copolymer.

9. The negative electrode of claim 7, wherein the lithium salt includes at least one selected from the group consisting of LiDFOB, LiFSI, LiSCN, $LiN(CN)_2$, $LiClO_4$, $LiBF_4$, $LiAsF_6$, $LiPF_6$, $LiCF_3SO_3$, $LiC(CF_3SO_2)_3$, $LiN(SO_2C_2F_5)_2$, $LiN(SO_2CF_3)_2$, $LiN(SO_2F)_2$, $LiSbF_6$, $LiPF_3(CF_2CF_3)_3$, $LiPF_3(CF_3)_3$, and $LiB(C_2O_4)_2$.

10. The negative electrode of claim 1, wherein the coating layer has a thickness in a range of 2 μm to 100 μm.

11. The negative electrode of claim 1, further comprising a solid electrolyte interface (SEI) film formed on the second negative electrode.

12. A lithium metal battery comprising:
a positive electrode;
the negative electrode of claim 1; and
an electrolyte between the positive electrode and the negative electrode.

13. The lithium metal battery of claim 12, wherein the positive electrode includes a positive electrode active material represented by Chemical Formula 1:

$$LiCo_{1-x}M_xO_2 \qquad \text{<Chemical Formula 1>}$$

wherein in the above formula,
M is at least one selected from the group consisting of Ni, Mn, Al, Cu, Fe, Mg, Cr, Zn, B, and Ga, and $0.5<x<1$.

14. The lithium metal battery of claim 12, wherein the electrolyte is a liquid electrolyte including a lithium salt and an organic solvent.

15. The lithium metal battery of claim 14, wherein the organic solvent is a carbonate-based compound or an ether-based compound.

* * * * *